(12) United States Patent
Skrabacz et al.

(10) Patent No.: US 10,571,311 B2
(45) Date of Patent: Feb. 25, 2020

(54) METHOD AND APPARATUS FOR TAMPER DETECTION ALONG ENCLOSED OR BURIED CONDUCTION MEDIA USING FLUORESCENT OPTICAL FIBER

(71) Applicant: The Johns Hopkins University, Baltimore, MD (US)

(72) Inventors: Eric R. Skrabacz, Aberdeen, MD (US); Paul R. Schuster, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 223 days.

(21) Appl. No.: 15/899,708

(22) Filed: Feb. 20, 2018

(65) Prior Publication Data

US 2019/0063961 A1    Feb. 28, 2019

Related U.S. Application Data (60) Provisional application No. 62/551,337, filed on Aug. 29, 2017.

(51) Int. Cl.
| | | |
|---|---|---|
| *G01D 5/353* | (2006.01) | |
| *G02B 6/50* | (2006.01) | |
| *G08B 21/18* | (2006.01) | |
| *G02B 6/42* | (2006.01) | |
| *G02B 6/44* | (2006.01) | |

(52) U.S. Cl.
CPC ....... *G01D 5/35345* (2013.01); *G02B 6/4298* (2013.01); *G02B 6/504* (2013.01); *G08B 21/182* (2013.01); *G02B 6/4206* (2013.01); *G02B 6/447* (2013.01)

(58) Field of Classification Search
CPC .. G01D 5/353; G01D 5/35345; G02B 6/4298; G02B 6/50
USPC ........................................ 250/227.14, 227.16
See application file for complete search history.

(56) References Cited

U.S. PATENT DOCUMENTS

| | | | | |
|---|---|---|---|---|
| 2005/0134837 | A1* | 6/2005 | Sarkozi ................. | G01D 5/268 356/73.1 |
| 2009/0132183 | A1* | 5/2009 | Hartog ............... | G01D 5/35303 702/42 |

OTHER PUBLICATIONS

P. Aiestaran, et al., "A fluorescent linear optical fiber position sensor," Optical Materials 31 (2009), May 21, 2008, pp. 1101-1104.
Industrial Fiber Optics (Internet Page, Unknown Author); "Fluorescent Optical Fiber," available at http://i-fiberoptics.com/fluorescent-fiber.php, last accessed Feb. 20, 2018.

* cited by examiner

*Primary Examiner* — Kevin K Pyo
(74) *Attorney, Agent, or Firm* — Noah J. Hayward (57) ABSTRACT

A method of detecting tampering with a conveyance medium may include determining a baseline brightness level detected at opposing ends of an optical fiber segment disposed proximate to the conveyance medium, determining whether a change in brightness above a threshold level occurs, and providing an output indicating that a breach in continuity of a shielding material that shields both the conveyance medium and the optical fiber segment from exposure to ambient light has occurred in response to the change in brightness being above the threshold level.

19 Claims, 6 Drawing Sheets

METHOD AND APPARATUS FOR TAMPER DETECTION ALONG ENCLOSED OR BURIED CONDUCTION MEDIA USING FLUORESCENT OPTICAL FIBER

CROSS-REFERENCE TO RELATED APPLICATIONS

This application claims priority to and the benefit of prior-filed, U.S. Provisional Application Ser. No. 62/551,337, filed on Aug. 29, 2017, the entire contents of which are hereby incorporated herein by reference.

STATEMENT OF GOVERNMENTAL INTEREST

This invention was made with Government support under contract number N00024-13-D-6400 awarded by the Naval Sea Systems Command (NAVSEA). The Government has certain rights in the invention.

TECHNICAL FIELD

Example embodiments generally relate to techniques for detecting tampering and, in particular, relate to apparatuses and/or methods for providing tamper detection along enclosed or buried conduction media such as wires and pipelines.

BACKGROUND

Pipeline companies and the Transportation and Safety Administration (TSA) have a continued interest in protecting the infrastructure that supports the flow of products through pipelines. In particular, there is an interest in knowing when a portion of the pipeline has been, or even is being, tampered with. However, especially due to the extremely long distances over which the pipelines extend, monitoring of the pipelines can be not only a technical challenge, but can also be cost prohibitive in nature.

Similarly, power cables, data cables and many other conveyance media may extend over vast distances, and yet be worthy of monitoring in order to maintain continuity of service and/or reduce maintenance costs. Accordingly, it may be desirable to identify a way to monitor conveyance media for potential tampering that can be effective and cost efficient.

BRIEF SUMMARY OF SOME EXAMPLES

Some example embodiments may enable the provision of a system for detection of tampering with a conveyance medium that addresses the challenges described above.

In one example embodiment, a system for detecting tampering with a conveyance medium is provided. The system may include a first sensor, a second sensor, and a doped side absorbing—end emitting optical fiber segment disposed proximate to the conveyance medium such that the conveyance medium and the optical fiber segment are each shielded from exposure to ambient light by a shielding material. The first sensor may be disposed at a first end of the optical fiber segment, and the second sensor may be disposed at a second end of the optical fiber segment. The first and second sensors may be configured to detect a change in brightness detected at the first and second ends of the optical fiber segment indicative of a breach in continuity of the shielding material.

In another example embodiment, a method of detecting tampering with a conveyance medium may be provided. The method may include determining a baseline brightness level detected at opposing ends of an optical fiber segment disposed proximate to the conveyance medium, determining whether a change in brightness above a threshold level occurs, and providing an output indicating that a breach in continuity of a shielding material that shields both the conveyance medium and the optical fiber segment from exposure to ambient light has occurred in response to the change in brightness being above the threshold level.

BRIEF DESCRIPTION OF THE SEVERAL VIEWS OF THE DRAWING(S)

Having thus described some non-limiting, example embodiments of the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, the term "conveyance media" should be understood to correspond to any devices that are configured to convey data, electricity or fluid over a distance. Thus, for example, a conveyance medium could be a pipe or other apparatus for conveying fluids (e.g., gas, water, oil, etc.) along with wires, cables or other apparatuses for conveying data or electricity.

As indicated above, some example embodiments may relate to the provision of effective and efficient tamper detection in potentially vast and challenging environments. Consider, for example, a pipeline that travels thousands of miles through areas that can be extremely remote. Surveillance by patrol, routine inspection, or even video monitoring would be extremely costly and/or technically challenging.

Meanwhile, fluorescent optical fiber (referred to hereinafter simply as optical fiber) is a side-absorbing, end-emitting fiber. Thus, the optical fiber absorbs light from its sides and then conveys that absorbed light to its respective ends. The brightness observed at the ends of the fiber is proportional to the amount of light absorbed on the sides. Common applications for fluorescent fiber include aiming sights, crafts, hobbies and communications. However, optical fiber may also be usable as a position sensor. It is the possibility of using optical fiber as a position sensor that makes optical fiber a particularly good candidate for use as a tamper detection means. Not only can the optical fiber be used to detect possible tampering on a section of conveyance media (which may be enough for some applications), but the optical fiber may actually be further able to indicate an approximate location of the possible tampering (which may be a bonus or even required for other applications).

Accordingly, since a large portion of the pipeline may be underground (i.e., not exposed to light), it may be possible to employ optical fiber along with the pipeline to detect when light exposure occurs (e.g., due to digging up the pipe for tampering purposes). Similarly, many data and power cables are buried underground and therefore, detection of light exposure along their lengths may be indicative of attempts to tamper with the cables. Alternatively, exposure of light may indicate a maintenance issue (e.g., a washout or other erosion of material occurring naturally, but still requiring attention from maintenance personnel. Basically, for any conveyance media that includes some form of shielding material (e.g., the ground or even sheathing or cladding around the conveyance media), a breach in the integrity or continuity of the shielding material may be detectable using optical fiber in the manner described herein. Also, for exposed pipes or conduits, the baseline intensity can be determined, and significant intensity changes can be detected, including the breaking or the cutting of the optical fiber itself.

Figure 1A:
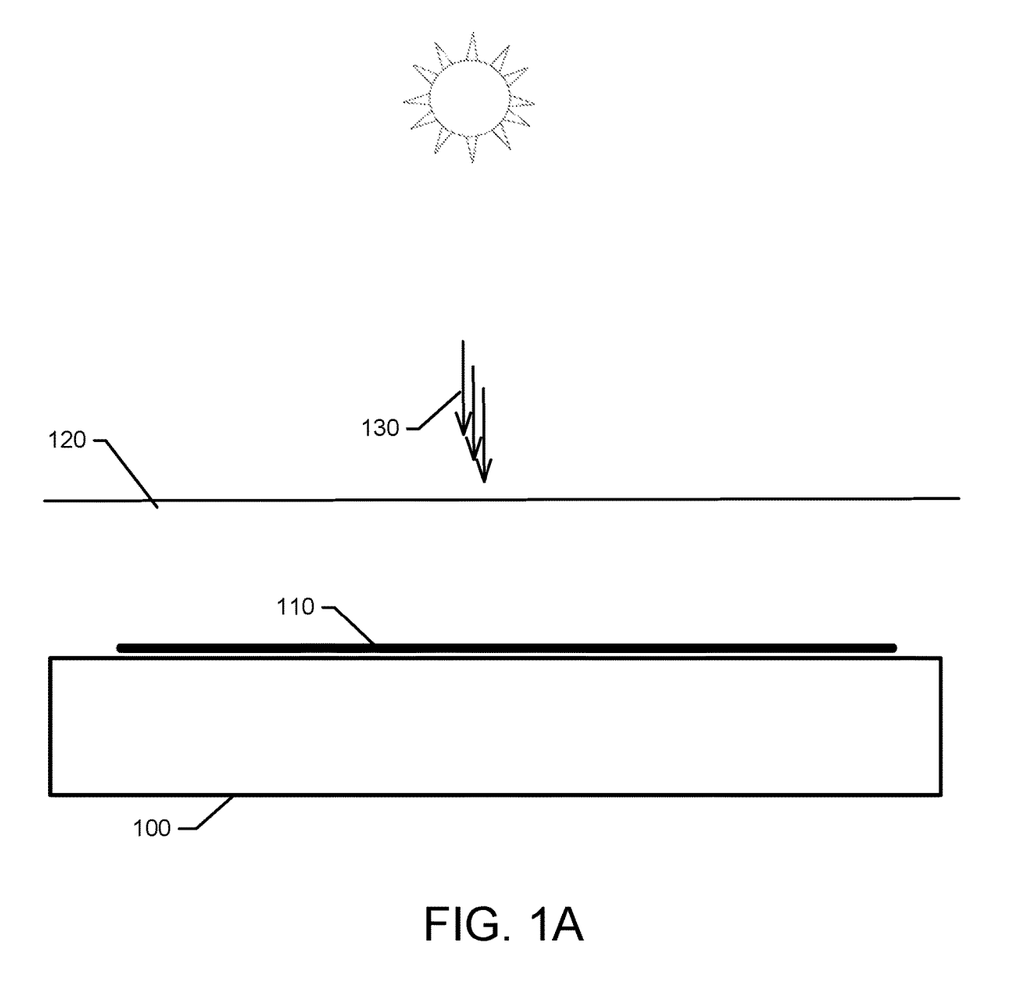
FIG. 1A illustrates a functional block diagram of various components that may be associated with defining incident detection system for monitoring a baseline situation for a conveyance medium according to an example embodiment.
Figure 1B:
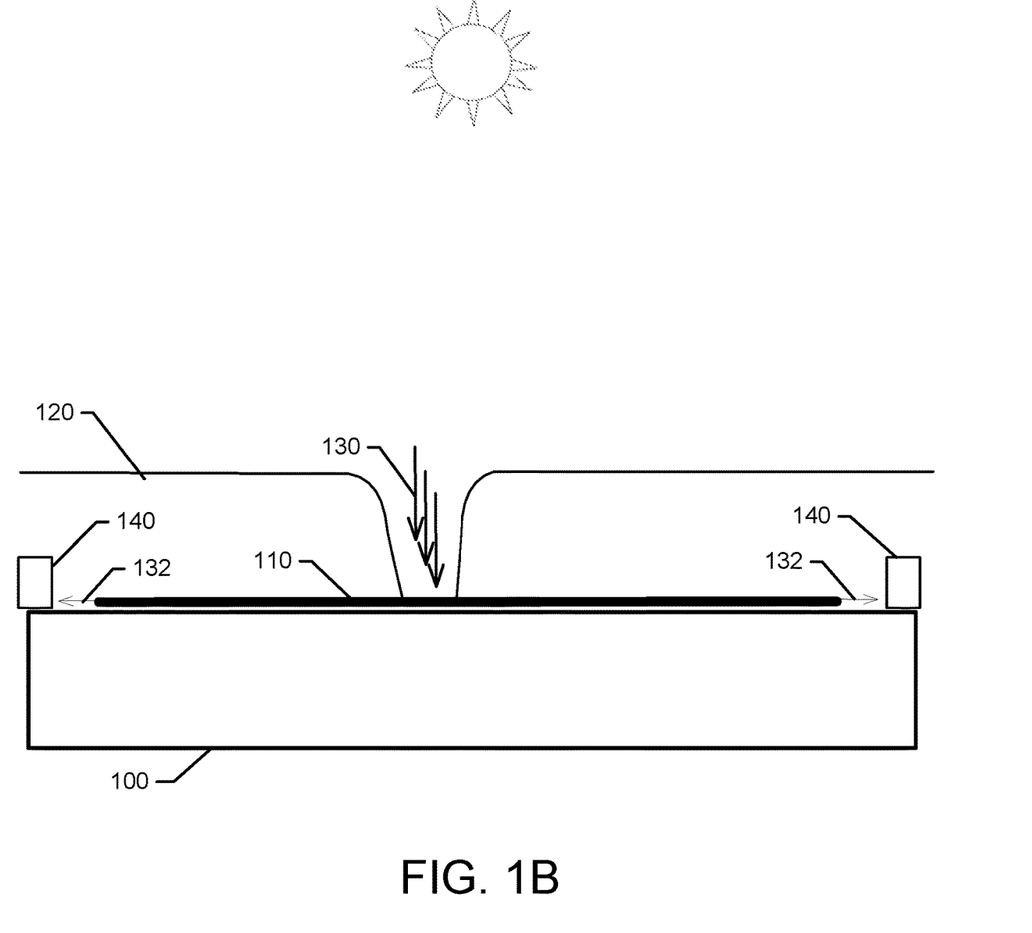
FIG. 1B illustrates a functional block diagram of some of the components of FIG. 1A responsive to exposure to ambient light due to a potential tampering event according to an example embodiment.

FIG. 1, which is defined by FIGS. 1A and 1B, illustrates a block diagram of an incident detection system in accordance with an example embodiment. The "incident" within this context may be a tampering event that causes exposure of optical fiber that was previously shielded from exposure to light by a shielding material. However, the incident could alternatively be a natural occurrence or any other event that may cause removal of the shielding material and thereby also cause exposure of light to the optical fiber.

Referring now to FIG. 1, the incident detection system may include a buried conveyance medium 100 and a corresponding optical fiber segment 110. The optical fiber segment 110 may extend along a continuous portion of the conveyance medium 100 and, in some cases, may be in contact with an outer surface of the conveyance medium 100. The conveyance medium 100 may also be substantially surrounded by shielding material 120 over at least the portion of the conveyance medium 100 over which the optical fiber segment 110 extends. Accordingly, as shown in FIG. 1A, as long as the shielding material 120 remains undisturbed or compromised, there will generally be no (or at least very little) ambient light 130 that is able to reach the optical fiber segment 110. However, if a breach or other loss of continuity or integrity in the shielding material 120 occurs, as shown in FIG. 1B, the ambient light 130 may be able to reach the optical fiber segment 110 and transfer along the optical fiber segment 110 to respective opposing ends thereof. In addition, with fiber breakage, whether intentional or unintentional (shovel tip) can be detected even before an exposure to ambient light takes place. In the case of an intentionally exposed fiber, the change in baseline intensity can be determined by the signal changes at the sensors located at opposing ends of the fiber.

As noted above, the brightness of light 132 transported to the ends of the optical fiber segment 110 may be proportional to the amount of light absorbed at the sides of the optical fiber segment 110 due to the incidence of the ambient light 130. Accordingly, an incident detection system may further include sensors 140 disposed at one or both of the ends of the optical fiber segment 110 to detect the light 132 that was transported to the ends of the optical fiber segment 110. The sensors 140 (or light detectors) may be configured to measure a baseline brightness level during the condition of FIG. 1A (i.e., when there is no breach or other loss of continuity or integrity of the shielding material 120). That baseline brightness level can then be compared to current measurements at the sensors 140 over time to determine whether a breach in the shielding material 120 has occurred. Moreover, as will be discussed below, it may also be possible to determine a location at which the breach occurred.

In some cases, where the conveyance medium 100 is transporting a fluid, the shielding material 120 may be dirt or other fill material provided over a buried pipeline. The optical fiber segment 110 may be attached to or otherwise laid alongside or on top of the conveyance material 100 to ensure that the optical fiber segment 110 is able to be exposed to the ambient light 130 responsive to digging downward from a surface of the earth. However, the conveyance medium 100 could alternatively be a cable (e.g., data or power cable), as mentioned above. If the conveyance medium 100 is a cable, the cable could also be buried and the optical fiber segment 110 may be provided alongside or on top of the cable, again to maintain the ability to achieve exposure due to digging downward from above.

The optical fiber segment 110 may be laid separately or together with the pipeline or cable. If laid separately, a trenching machine could be used to lay the optical fiber segment at a depth above the depth of the pipeline or cable. However, if laid together, the optical fiber segment 110 could be laid with (e.g., on top of) the pipeline or cable before burial of both together by the shielding material 120. In still other examples, the optical fiber segment 110 could be laid with the cable by a trenching and cable laying machine. In some cases, the optical fiber segment 110 may be attached to the conveyance medium 100 (e.g., with straps or other attachment means). However, in some cases, the fiber segment 110 may simply be held in position proximate to the conveyance medium 100 by the shielding material 120.

Meanwhile, in examples where the shielding material 120 is a sheathing, cladding or other such covering of the conveyance material 100, the optical fiber segment 110 could be provided inside of the sheathing or cladding such that any cut, tear or other damage to the sheathing or cladding that leaves the optical fiber segment 110 exposed to the ambient light 130 can be detected. If the optical fiber segment 110 is provided inside the sheathing or cladding, some embodiments may provide a consistent location for the optical fiber segment 110 inside the cladding or sheathing, and the location may be marked (e.g., with a reference line) on the outer surface of the conveyance medium 100. Thus, since the orientation of any potential source of the ambient light 130 may not be as predictable as the location of the sun relative to a buried pipeline segment, each particular context in which the conveyance medium 100 may be used can be evaluated and the installer of the conveyance medium 100 can install the conveyance medium such that the reference line is positioned toward the source of the ambient light 130 for the particular context. In still other alternatives, the optical fiber segment 110 may be wound around the conveyance medium 100 in such a way as to expose portions of the optical fiber segment 110 to all possible orientations (i.e., 360 degrees) around the conveyance medium 100. In other words, the optical fiber segment 110 may be placed proximate to the conveyance medium 100 in either a configuration that supports detection of light from either one direction (i.e., one side) relative to the direction of extension of the conveyance medium 100 or from multiple directions (or even all sides) relative to the direction of extension of the conveyance medium 100.

Figure 2:
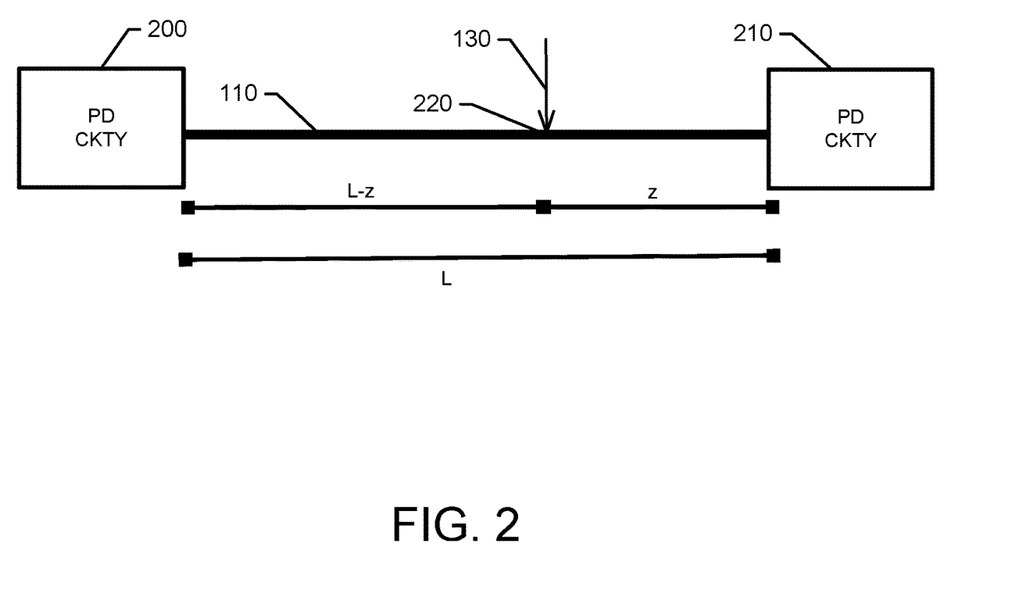
FIG. 2 illustrates a conceptual block diagram for the performance of location determination in accordance with an example embodiment.

As discussed above and shown in FIG. 1B, if exposure to the ambient light 130 occurs, sensors 140 disposed at one or both of the ends of the optical fiber segment 110 to detect the light 132 that was transported to the ends of the optical fiber segment 110 may sense an increase in brightness of the light 132. If sensors 140 are provided at respective opposing ends of the optical fiber segment 110, such an increase in the brightness of the light 132 can be deduced as being a likely result of a breach in the shielding material 120 along the optical fiber segment 110. However, it may further be possible to determine an approximate location along the length of the optical fiber segment 110 where the breach occurred. FIG. 2 demonstrates how such an approximation may be made in accordance with an example embodiment.

Referring now to FIG. 2, a first instance of photo detection circuitry 200 (e.g., a photo detector and corresponding electronic circuitry) and a second instance of photo detection circuitry 210 may be placed on opposite ends of the optical fiber segment 110. As such, it can be appreciated that the photo detectors of the photo detection circuitry 200 and 210 are examples of the sensors 140 of FIG. 1B. The optical fiber segment 110 may have a length (L), and the breach in the continuity or integrity of the shielding material 120 may occur at a breach location 220 where the ambient light 130 reaches a side portion of the optical fiber segment 110. A position of the breach location 220 may be a distance (z) from the second instance of photo detection circuitry 210 and a distance (L-z) from the first instance of photo detection circuitry 200.

As noted above, the occurrence of the breach in the continuity or integrity of the shielding material 120 causes an increase in brightness measured at the respective ends of the optical fiber segment 110. However, the actual amount measured at each respective end will also be related to the distance between the corresponding end and the breach location 220.

In this regard, the power ($P_1$) detected by the first instance of photo detection circuitry 200 and the power ($P_2$) detected by the second instance of photo detection circuitry 210 may be given by the equations: $P_1=k_1 \exp(-\alpha z)$ and $P_2=k_2 \exp(-\alpha(L-z))$. In these equations, a is a fiber attenuation constant and k is a constant that represents the light power captured by the optical fiber segment 110. The ratio of the equations for $P_1$ and $P_2$ can be solved to find the distance (z), as shown below:

$$z = k + \frac{L}{2} + \frac{1}{2\alpha}\ln\left(\frac{P2}{P1}\right) = \frac{L}{2} + \frac{1}{2\alpha}\ln\left(\frac{V2}{V1}\right);$$

$$k = \frac{1}{2\alpha}\ln\frac{k_1}{k_2},,$$

where (z) effectively defines the breach location 220.

Figure 3:
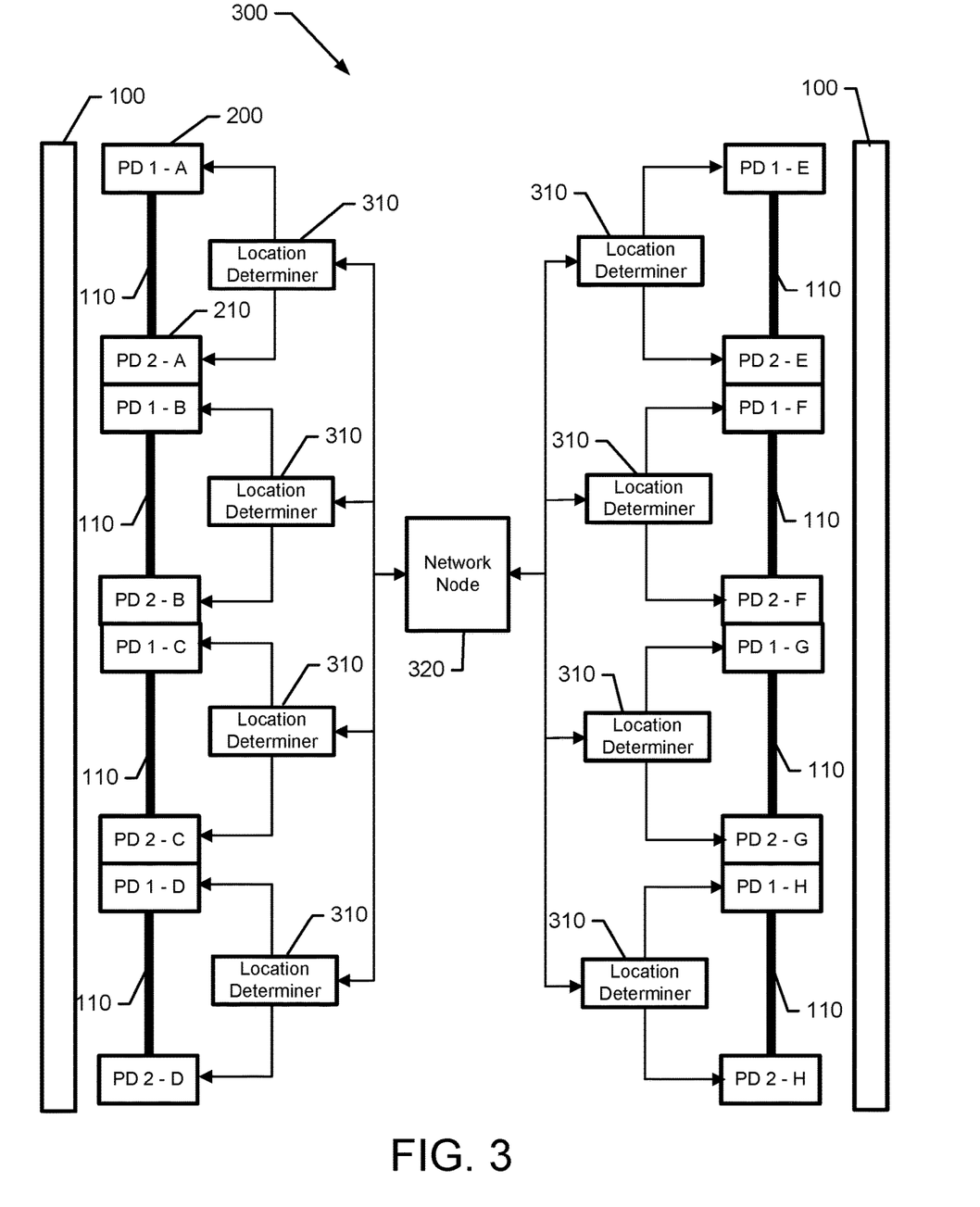
FIG. 3 illustrates a system for detecting tampering with a conveyance medium in accordance with an example embodiment.

In some example embodiments, a number of instances of optical fiber segments may be distributed along various portions of a conveyance medium to define a tampering detection system 300 as shown in FIG. 3. FIG. 3 illustrates two separate instances of conveyance media 100. However, it should be appreciated that the system 300 could be applicable to a single conveyance medium 100 or to more than two instances of conveyance media 100. For each respective instance of the conveyance medium 100, there is a corresponding series of optical fiber segments 110 that is positioned proximate thereto. The optical fiber segments 110 could be positioned to provide continuous or nearly continuous coverage of each respective instance of the conveyance medium 100. Thus, for example, a distal end of one instance of the optical fiber segment 110 may terminate where (or nearly where) a proximal end of another instance of the optical fiber segment 110 begins. However, there is no requirement for continuous coverage, so gaps of any size could be provided between individual instances of the optical fiber segments 110. Furthermore, the lengths of the optical fiber segments 110 could be selected to provide any suitable monitoring length. For example, in some cases the photo detectors and photo amplifiers used in the first and second instances of photo detection circuitry 200 and 210 may be configured to provide an indication of a threshold level of light sensed thereat, and it may be determined that the threshold level cannot be achieved beyond a certain length of optical fiber segment for a normal ambient light condition thereby providing a constraint on the length of the optical fiber segment 110. This length could be feet or hundreds/thousands of feet for some applications, and on the order of miles for other applications.

As shown in FIG. 3, respective first and second instances of photo detection circuitry 200 and 210 may be provided at the ends of each of the optical fiber segments 110. In FIG. 3, the respective instances are labeled PD 1 and PD 2, and each pair is given a letter designator from A to H. Pairs of PD 1 and PD 2 A, B, C and D monitor the instance of the conveyance medium 100 that is on the left side of the page, and pairs of PD 1 and PD 2 E, F, G and H monitor the instance of the conveyance medium 100 that is one the right side of the page. A location determiner 310 may be in communication with each respective pair of PD 1 and PD 2. The location determiner 310 may be configured to use the equations explained above to determine, for any output at the respective first and second instances of photo detection circuitry 200 and 210 (i.e., a given pair of PD 1 and PD 2) that is above a threshold level, a breach location for corresponding cause of the output. The location determiner 310 may also or alternatively provide an indication, output or alarm to indicate the fact that the threshold level has been exceeded. In some cases, monitoring personnel may travel to a monitoring station at which the location determiner 310 may be mounted, and the monitoring stations may be located relatively close to (or between) the respective ends of the corresponding optical fiber segment 110. The monitoring personnel may physically inspect the location determiner 310 to determine whether an indication, output or alarm has been provided and therefore also whether and perhaps where a breach in the shielding material 120 has occurred. Thus, for example, the monitoring personnel may receive an indication of the breach location and may report the same, and/or proceed to the breach location to inspect or affect a repair.

As an alternative to physically reading an output of the location determiner 310, some example embodiments may further connect one or more of the location determiners 310 to a network node 320 (or hub). The network node 320 may be communicatively coupled to one or more instances of the location determiners 310 by either wired or wireless communication mechanisms. Thus, for example, a local radio transmitter (and/or receiver) may be provided at the location determiner 310 and a corresponding remote radio receiver (and/or transmitter) may be provided at the network node 320 to enable one way or two way communication between the network node 320 and the location determiners 310. The outputs, alarms or other indications that would be generated locally at the location determiners 310 may therefore be communicated to the network node 320 where a central monitoring agent can monitor individual sections of the conveyance media 100 or the entirety of the conveyance media 100.

Figure 4:
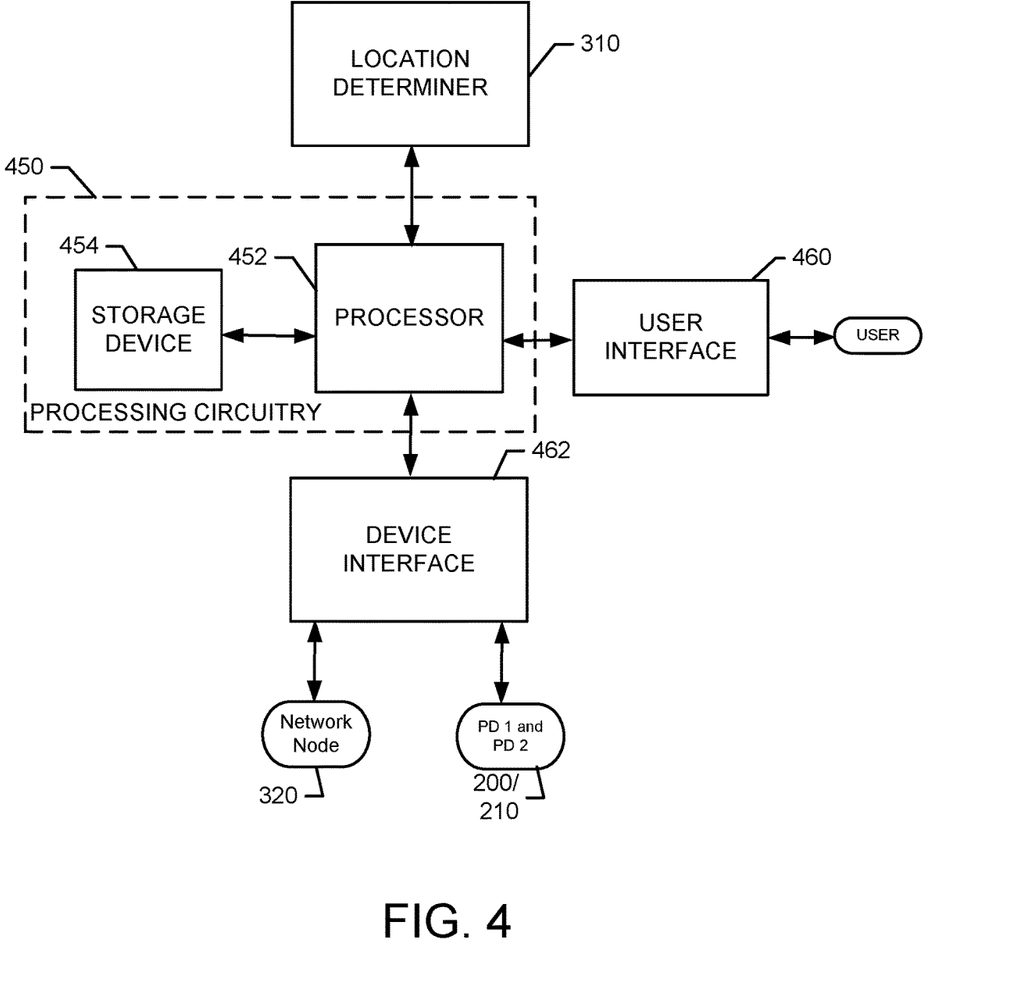
FIG. 4 illustrates an apparatus for detecting tampering with a conveyance medium according to an example embodiment.

FIG. 4 shows certain elements of an apparatus for determining a location of a tampering event according to an example embodiment. The apparatus of FIG. 4 may be employed on a device such as, for example, the location determiner 310 and/or the network node 320 of FIG. 3. Referring now to FIG. 4, an apparatus for determining a location of a tampering event may include or otherwise be an embodiment of a location determiner 310 or a device hosting the location determiner 310. As such, configuration of the apparatus as described herein may transform the apparatus into the location determiner 310. In an example embodiment, the apparatus may include or otherwise be in communication with processing circuitry 450 that is configured to perform data processing, application execution and other processing and management services according to an example embodiment of the present invention. In one embodiment, the processing circuitry 450 may include a storage device 454 and a processor 452 that may be in communication with or otherwise control a user interface 460 (which may be optional) and a device interface 462. As such, the processing circuitry 450 may be embodied as a circuit chip (e.g., an integrated circuit chip) configured (e.g., with hardware, software or a combination of hardware and software) to perform operations described herein. However, in some embodiments, the processing circuitry 450 may be embodied as a portion of a server, computer, laptop, workstation or even one of various mobile computing devices. In situations where the processing circuitry 450 is embodied as a server or at a remotely located computing device, the user interface 460 (if employed at all) may be disposed at another device (e.g., at a computer terminal or client device such as a smartphone) that may be in communication with the processing circuitry 450 via the device interface 462 and/or a network.

The user interface 460 (if employed) may be in communication with the processing circuitry 450 to receive an indication of a user input at the user interface 460 and/or to provide an audible, visual, mechanical or other output to the user. As such, the user interface 460 may include, for example, a keyboard, a mouse, a joystick, a display, a touch screen, a microphone, a speaker, a cell phone, or other input/output mechanisms. In embodiments where the apparatus is embodied at a server or other network entity, the user interface 460 may be limited or even eliminated in some cases. Alternatively, as indicated above, the user interface 460 may be remotely located. In some cases, the user interface 460 may also include a series of web pages or interface consoles generated to guide the user through various options, commands, flow paths and/or the like for control of or interaction with the location determiner 310. The user interface 460 may also include interface consoles or message generation capabilities to send instructions (e.g., to inspect or otherwise proceed to a particular location), warnings, alarms, etc., and/or to provide an output that clearly indicates an instance of a potential breach and/or a location of a potential breach in the shielding material 120 proximate to the optical fiber segment 110.

The device interface 462 may include one or more interface mechanisms for enabling communication with other devices and/or networks. In some cases, the device interface 462 may be any means such as a device or circuitry embodied in either hardware, software, or a combination of hardware and software that is configured to receive and/or transmit data from/to a network and/or any other device or module in communication with the processing circuitry 450. In this regard, the device interface 462 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 462 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 454 may include one or more non-transitory storage or memory devices such as, for example, volatile and/or non-volatile memory that may be either fixed or removable. The storage device 454 may be configured to store information, data, applications, instructions or the like for enabling the apparatus to carry out various functions in accordance with example embodiments of the present invention. For example, the storage device 454 could be configured to buffer input data for processing by the processor 452. Additionally or alternatively, the storage device 454 could be configured to store instructions for execution by the processor 452. As yet another alternative, the storage device 454 may include one of a plurality of databases that may store a variety of files, contents or data sets. Among the contents of the storage device 454, applications may be stored for execution by the processor 452 in order to carry out the functionality associated with each respective application. One example application may be configured to define a monitoring API for remote monitoring of the location determiners 310 and for display of warnings of potential tampering incidents and/or of the location of any potential breaches.

The processor 452 may be embodied in a number of different ways. For example, the processor 452 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 452 may be configured to execute instructions stored in the storage device 454 or otherwise accessible to the processor 452. As such, whether configured by hardware or software methods, or by a combination thereof, the processor 452 may represent an entity (e.g., physically embodied in circuitry) capable of performing operations according to embodiments of the present invention while configured accordingly. Thus, for example, when the processor 452 is embodied as an ASIC, FPGA or the like, the processor 452 may be specifically configured hardware for conducting the operations described herein. Alternatively, as another example, when the processor 452 is embodied as an executor of software instructions, the instructions may specifically configure the processor 452 to perform the operations described herein.

In an example embodiment, the processor 452 (or the processing circuitry 450) may be embodied as, include or otherwise control the location determiner 310, which may be any means such as a device or circuitry operating in accordance with software or otherwise embodied in hardware or a combination of hardware and software (e.g., processor 452 operating under software control, the processor 452 embodied as an ASIC or FPGA specifically configured to perform the operations described herein, or a combination thereof) thereby configuring the device or circuitry to perform the corresponding functions of the location determiner 310 as described herein.

The location determiner 310 may be configured to analyze sensor data (e.g., from the PD 1 and PD 2 for any given optical fiber segment 110 to determine the existence of a potential breach, location of a potential breach and/or generate warnings and/or instructions for responding to the potential breach.

Figure 5:
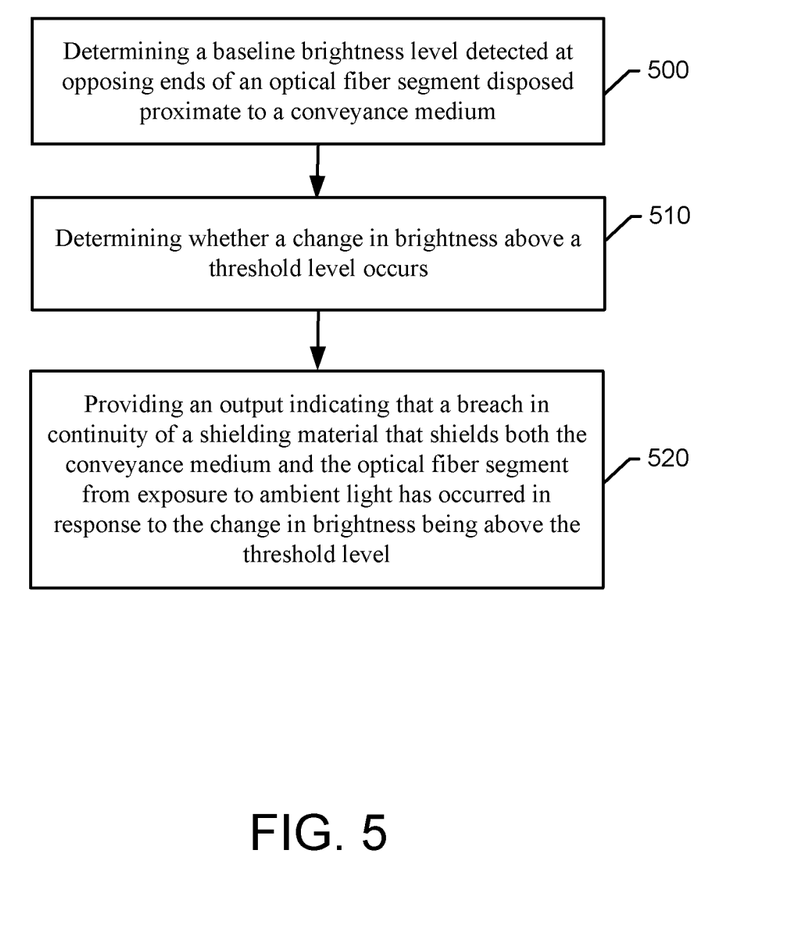
FIG. 5 illustrates a method of detecting tampering with a conveyance medium according to an example embodiment.

From a technical perspective, the location determiner 310 described above may be used to support some or all of the operations described above. As such, the platform described in FIGS. 3-4 may be used to facilitate the implementation of several computer program and/or network communication based interactions. As an example, FIG. 5 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a terminal (e.g., the location determiner, the network node and/or the like) and executed by a processor in the terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method of detecting tampering with a conveyance medium according to one embodiment of the invention, as shown in FIG. 5, may include determining a baseline brightness level detected at opposing ends of an optical fiber segment disposed proximate to the conveyance medium at operation 500, determining whether a change in brightness above a threshold level occurs at operation 510, and providing an output indicating that a breach in continuity of a shielding material that shields both the conveyance medium and the optical fiber segment from exposure to ambient light has occurred in response to the change in brightness being above or below the threshold level or baseline level at operation 520. Of note, the brightness change may be an increase (e.g., due to increased exposure to light) or a decrease (e.g., due to severing or cutting the optical fiber segment).

In some embodiments, the features or operations described above may be augmented or modified, or additional features or operations may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, determining the baseline brightness level and determining whether the change in brightness is above the threshold level may each be performed responsive to taking measurements of brightness at a first sensor disposed at a first end of the optical fiber segment and a second sensor disposed at a second end of the optical fiber segment. In some examples, providing the output may include determining a location of the breach based on a comparison of respective power levels detected at the first and second sensors. In an example embodiment, determining the location of the breach may include determining the location at a location determiner disposed proximate to the optical fiber segment and generating an alarm locally at the location determiner. Alternatively or additionally, determining the location of the breach may include determining the location at a network node disposed remotely from the optical fiber segment and generating an alarm at the network node. In an example embodiment, the network node may be operably coupled to a plurality of sensors disposed proximate to respective ends of multiple optical fiber segments that each are disposed proximate to respective portions of one or more conveyance media.

In an example embodiment, an apparatus for performing the method of FIG. 5 above may comprise a processor (e.g., the processor 452) or processing circuitry configured to perform some or each of the operations (500-520) described above. The processor may, for example, be configured to perform the operations (500-520) by performing hardware implemented logical functions, executing stored instructions, or executing algorithms for performing each of the operations. In some embodiments, the processor or processing circuitry may be further configured for the additional operations or optional modifications to operations 500 to 520 that are discussed above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A system for detecting tampering with a conveyance medium, the system comprising:
   an optical fiber segment disposed proximate to the conveyance medium, the conveyance medium and the optical fiber segment each being shielded from exposure to ambient light by a shielding material;
   a first sensor disposed at a first end of the optical fiber segment;
   a second sensor disposed at a second end of the optical fiber segment; and
   a location determiner,
   wherein the first and second sensors are configured to detect a change in brightness detected at the first and second ends, respectively, of the optical fiber segment indicative of a breach in continuity of the shielding material, and
   wherein the location determiner comprises processing circuitry configured to:
     receive an indication of a baseline brightness level detected at the first and second ends of the optical fiber segment;
     receive an indication of the change in brightness detected being above a threshold level; and
     provide an output indicating that the breach in continuity of the shielding material has occurred.

2. The system of claim 1, wherein providing the output comprises determining a location of the breach based on a comparison of respective power levels detected at the first and second sensors.

3. The system of claim 1, wherein providing the output comprises generating an alarm.

4. The system of claim 3, wherein a location determiner is disposed proximate to the optical fiber segment and the alarm is generated locally at the location determiner.

5. The system of claim 3, wherein a location determiner is disposed proximate to the optical fiber segment,
   wherein the location determiner is communicatively coupled to a network node disposed remotely from the optical fiber segment and the conveyance medium, and
   wherein the alarm is generated at the network node.

6. The system of claim 5, wherein providing the output comprises determining a location of the breach based on a comparison of respective power levels detected at the first and second sensors, and the location of the breach is displayed at the network node.

7. The system of claim 5, wherein the network node is operably coupled to a plurality of sensors disposed proximate to respective ends of multiple optical fiber segments that each are disposed proximate to respective portions of one or more conveyance media.

8. The apparatus of claim 1, wherein the conveyance medium is buried underground such that the shielding material is the ground.

9. The apparatus of claim 8, wherein the conveyance medium is a pipeline configured to transport a fluid.

10. The apparatus of claim 8, wherein the conveyance medium is a power or data cable.

11. The apparatus of claim 1, wherein the conveyance medium is a power or data cable, and wherein the shielding material is a cladding or sheathing provided around the conveyance medium.

12. The apparatus of claim 1, wherein the optical fiber segment is disposed proximate to one side of the conveyance medium to detect the exposure to ambient light from a corresponding direction relative to the conveyance medium.

13. The apparatus of claim 1, wherein the optical fiber segment is disposed to detect ambient light from multiple directions at sides of the conveyance medium.

14. A method of detecting tampering with a conveyance medium, the method comprising:
   determining a baseline brightness level detected at opposing ends of an optical fiber segment disposed proximate to the conveyance medium;
   determining whether a change in brightness above a threshold level occurs; and
   providing an output indicating that a breach in continuity of a shielding material that shields both the conveyance medium and the optical fiber segment from exposure to ambient light has occurred in response to the change in brightness being above the threshold level.

15. The method of claim 14, wherein determining the baseline brightness level and determining whether the change in brightness is above the threshold level or below a baseline intensity are each performed responsive to taking measurements of brightness at a first sensor disposed at a first end of the optical fiber segment and a second sensor disposed at a second end of the optical fiber segment.

16. The method of claim 15, wherein providing the output comprises determining a location of the breach based on a comparison of respective power levels detected at the first and second sensors.

17. The method of claim 16, wherein determining the location of the breach comprises determining the location at a location determiner disposed proximate to the optical fiber segment and generating an alarm locally at the location determiner.

18. The method of claim 16, wherein determining the location of the breach comprises determining the location at a network node disposed remotely from the optical fiber segment and generating an alarm at the network node.

19. The method of claim 18, wherein the network node is operably coupled to a plurality of sensors disposed proximate to respective ends of multiple optical fiber segments that each are disposed proximate to respective portions of one or more conveyance media.

* * * * *